(12) United States Patent
Arikawa et al.

(10) Patent No.: US 10,235,328 B2
(45) Date of Patent: Mar. 19, 2019

(54) CALCULATION DEVICE, CALCULATION METHOD, AND STORAGE MEDIUM

(71) Applicant: CASIO COMPUTER CO., LTD., Shibuya-ku, Tokyo (JP)

(72) Inventors: Kazuhiko Arikawa, Hamura (JP); Hiroaki Yoshizawa, Ome (JP); Hironori Yoshikawa, Sagamihara (JP); Toshibumi Takashima, Kunitachi (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/711,772

(22) Filed: Sep. 21, 2017

(65) Prior Publication Data
US 2018/0081851 A1   Mar. 22, 2018

(30) Foreign Application Priority Data
Sep. 21, 2016   (JP) .................................. 2016-184044

(51) Int. Cl.
*G06F 15/02*   (2006.01)
(52) U.S. Cl.
CPC ............ *G06F 15/025* (2013.01); *G06F 15/02* (2013.01); *G06F 15/0216* (2013.01); *G06F 15/0225* (2013.01)
(58) Field of Classification Search
CPC ............................ G06F 15/0225; G06F 15/025
See application file for complete search history.

(56) References Cited

U.S. PATENT DOCUMENTS

| 5,943,247 A * | 8/1999 | Kaya .................. G06F 15/02 708/105 |
| 9,390,051 B2 | 7/2016 | Arikawa |
| 2006/0190382 A1* | 8/2006 | Psencik .................. G06F 15/02 705/37 |

(Continued)

FOREIGN PATENT DOCUMENTS

| JP | 57189265 A | 11/1982 |
| JP | 10143472 A | 5/1998 |

(Continued)

OTHER PUBLICATIONS

Japanese Office Action dated Jul. 10, 2018 (and English translation thereof) issued in counterpart Japanese Application No. 2016-184044.

*Primary Examiner* — Chuong D Ngo
(74) *Attorney, Agent, or Firm* — Holtz, Holtz & Volek PC

(57) ABSTRACT

A calculation device comprises a display including both a first display area and a second display area, and a processor being configured to accept operations of at least one of a tax calculation key which are associated with a plurality of tax rates, respectively, to display, when the operation of the tax calculation key associated with any one of the plurality of tax rates was accepted with respect to numerical value data which indicates tax-excluded amount data displayed on the first display area, tax-included amount data on the first display area, the tax-included amount data being calculated based on the tax rate corresponding to the tax calculation key; and to display, on the second display area, tax-included total amount data which indicates a total of the tax-included amount data corresponding to at least one of the numerical value data.

9 Claims, 10 Drawing Sheets

(56) References Cited

U.S. PATENT DOCUMENTS

2014/0082034 A1\*  3/2014  Arikawa ................ G06F 15/02
                                                          708/130

FOREIGN PATENT DOCUMENTS

| JP | 2000268002 A | 9/2000 |
|----|--------------|--------|
| JP | 2001109721 A | 4/2001 |
| JP | 2002251381 A | 9/2002 |
| JP | 2003109121 A | 4/2003 |
| JP | 2006293498 A | 10/2006 |
| JP | 2008191771 A | 8/2008 |
| JP | 2013003840 A | 1/2013 |
| JP | 2015102881 A | 6/2015 |

\* cited by examiner

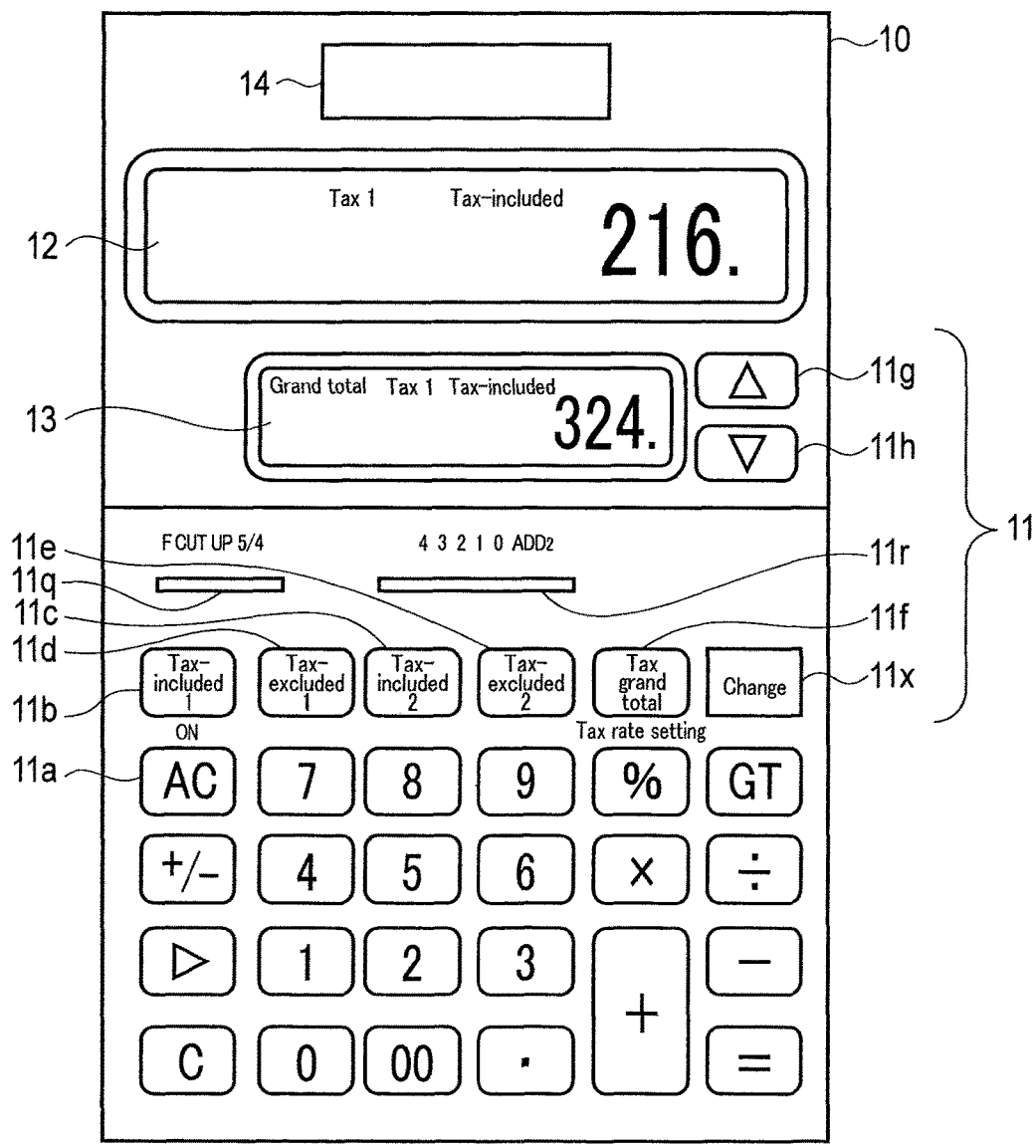
F I G. 1

| | Input | Display |
|---|---|---|
| | | ⟨ Tax rate 1 = 8% / tax rate 2 = 10% ⟩ |
| (A) | AC (11a) | 0.  ~12<br>0.  ~13 |
| (B) | 100  Tax-included 1 (11b) | Tax 1  Tax-included  108.<br>Grand total  Tax 1  Tax-included  108. |
| (C) | 200  Tax-included 1 | Tax 1  Tax-included  216.<br>Grand total  Tax 1  Tax-included  324. |
| (D) | Tax-included 1 | Tax 1  Tax  16.<br>Grand total  Tax 1  Tax  24. |
| (E) | Tax-included 1 | Tax 1  Tax-included  216.<br>Grand total  Tax 1  Tax-included  324. |
| (F) | Tax-excluded 1 (11d) | Tax 1  Tax-excluded  200.<br>Grand total  Tax 1  Tax-excluded  300. |

F I G. 7

|   | Input | Display |
|---|---|---|
| (A) | 500  11c [Tax-included 2] | Tax 2  Tax-included  550. ~12<br>Grand total  Tax 2  Tax-included  550. ~13 |
| (B) | 200  [Tax-included 2] | Tax 2  Tax-included  220.<br>Grand total  Tax 2  Tax-included  770. |
| (C) | [Tax-included 2] | Tax 2  Tax  20.<br>Grand total  Tax 2  Tax  70. |
| (D) | [Tax-included 2] | Tax 2  Tax-included  220.<br>Grand total  Tax 2  Tax-included  770. |
| (E) | 11e [Tax-excluded 2] | Tax 2  Tax-excluded  200.<br>Grand total  Tax 2  Tax-excluded  700. |

F I G. 8

CALCULATION DEVICE, CALCULATION METHOD, AND STORAGE MEDIUM

CROSS-REFERENCE TO RELATED APPLICATIONS

This application is based upon and claims the benefit of priority from prior Japanese Patent Application No. 2016-184044, filed Sep. 21, 2016, the entire contents of which are incorporated herein by reference.

BACKGROUND OF THE INVENTION

1. Field of the Invention

The present invention relates to a calculation device which performs a tax calculation, a calculation method, and a storage medium.

2. Description of the Related Art

There is known a conventional calculation device (electronic calculator) which includes a function of performing a tax calculation by using a plurality of tax rates.

There has been proposed an electronic calculator (see, e.g. Jpn. Pat. Appln. KOKAI Publication No. H10-143472). In this calculator, for example, a tax-included key (confirmation key) is operated in a state in which an arbitrary operation of the four basic arithmetic operations has been performed and a numerical value (amount), which is a target of multiplication, has been displayed. Then, a tax-included amount based on a first tax rate is calculated with respect to the displayed numerical value, and the calculated tax-included amount is displayed. If the tax-included key (confirmation key) is further operated in the same manner, a tax-included amount based on a second tax rate is calculated with respect to the displayed numerical value, and the calculated tax-included amount is displayed.

In addition, there has been proposed a calculation device (see, e.g. Jpn. Pat. Appln. KOKAI Publication No. 2000-268002). In this calculator, tax rates of up to eight kinds can be set in a tax rate memory, and a tax rate can be selected by designating a number. After the tax rate was selected, if an arithmetic operation and "tax-included" are successively input-operated, a tax-included calculation corresponding to the selected tax rate is executed with respect to a numerical value which is a result of the arithmetic operation, and the tax-included amount is displayed.

On the other hand, there has been proposed an electronic calculator (see, e.g. Jpn. Pat. Appln. KOKAI Publication No. 2013-003840) which includes a main display screen and a sub-display screen, and can perform a calculation work while switching the two screens.

In an electronic device such as the electronic calculator including two screens, there has been a demand for enabling, by a simple operation, easy display of a tax-included total amount based on each of a plurality of tax rates, when tax calculations are performed by using the plural tax rates.

BRIEF SUMMARY OF THE INVENTION

According to one embodiment, a calculation device includes a display including a first display area and a second display area; and a processor. The processor is configured to accept operations of at least one of a tax calculation key which are associated with a plurality of tax rates, respectively; configured to display, when the operation of the tax calculation key associated with any one of the plurality of tax rates was accepted with respect to numerical value data which indicates tax-excluded amount data displayed on the first display area, tax-included amount data on the first display area, the tax-included amount data being calculated based on the tax rate corresponding to the tax calculation key; and configured to display, on the second display area, tax-included total amount data which indicates a total of the tax-included amount data corresponding to at least one of the numerical value data.

In the embodiment, two screen are provided, and, when a tax calculation is performed by using a plurality of tax rates, there is an advantage that a tax-included total amount based on each of tax rates can easily be displayed by a simple operation.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a front view illustrating an external-appearance configuration of an electronic calculator 10 according to an embodiment of a tax calculation device of the present invention.

FIG. 7 is a view illustrating a concrete example (part 1) of an input operation and display for describing a tax calculation function of the electronic calculator 10 in the embodiment.

FIG. 8 is a view illustrating a concrete example (part 2) of the input operation and display for describing the tax calculation function of the electronic calculator 10 in the embodiment.

DETAILED DESCRIPTION OF THE PREFERRED EMBODIMENTS

Figure 2:
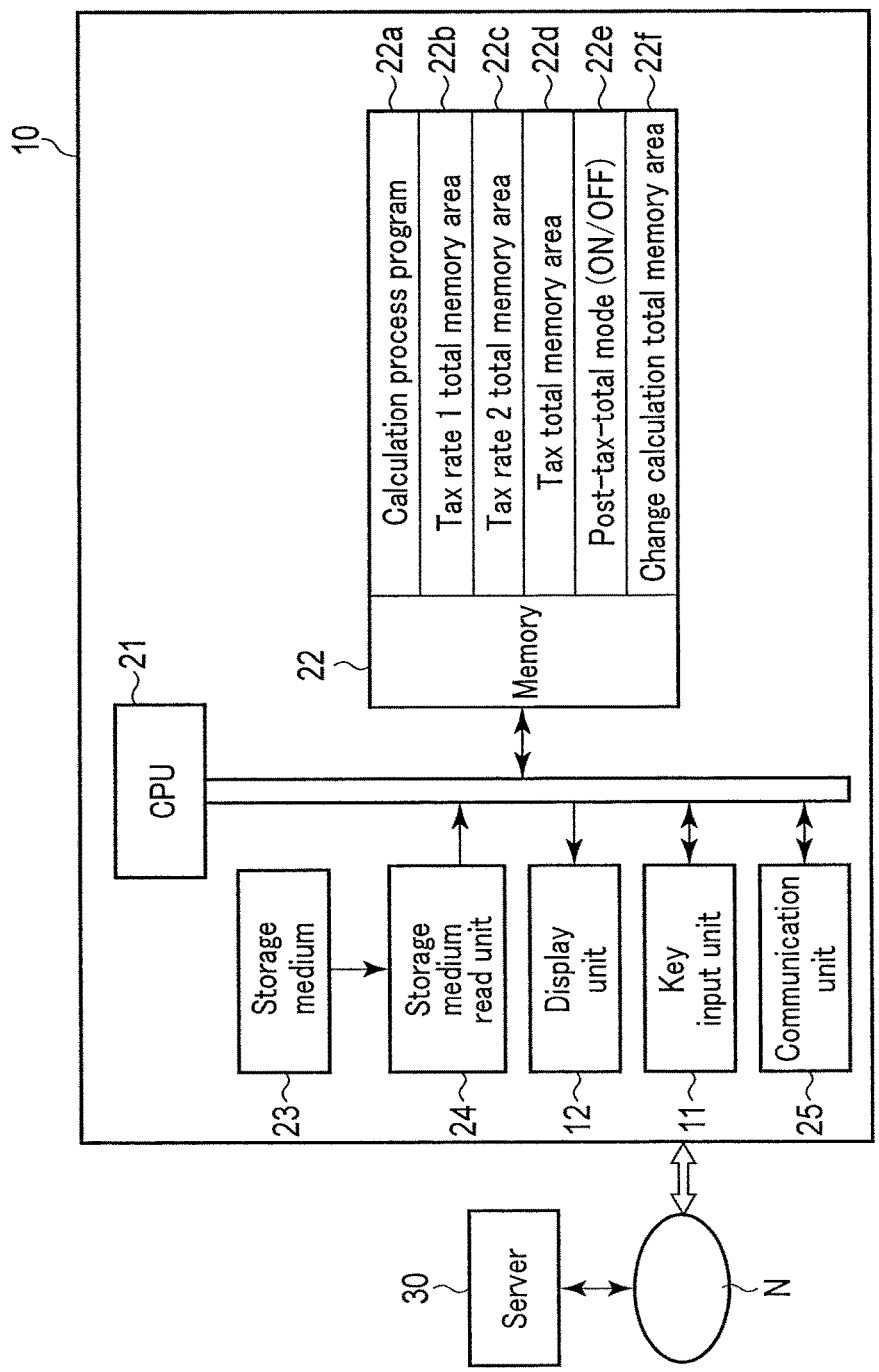
FIG. 2 is a block diagram illustrating the configuration of an electronic circuit of the electronic calculator 10 in the embodiment.
Figure 3:
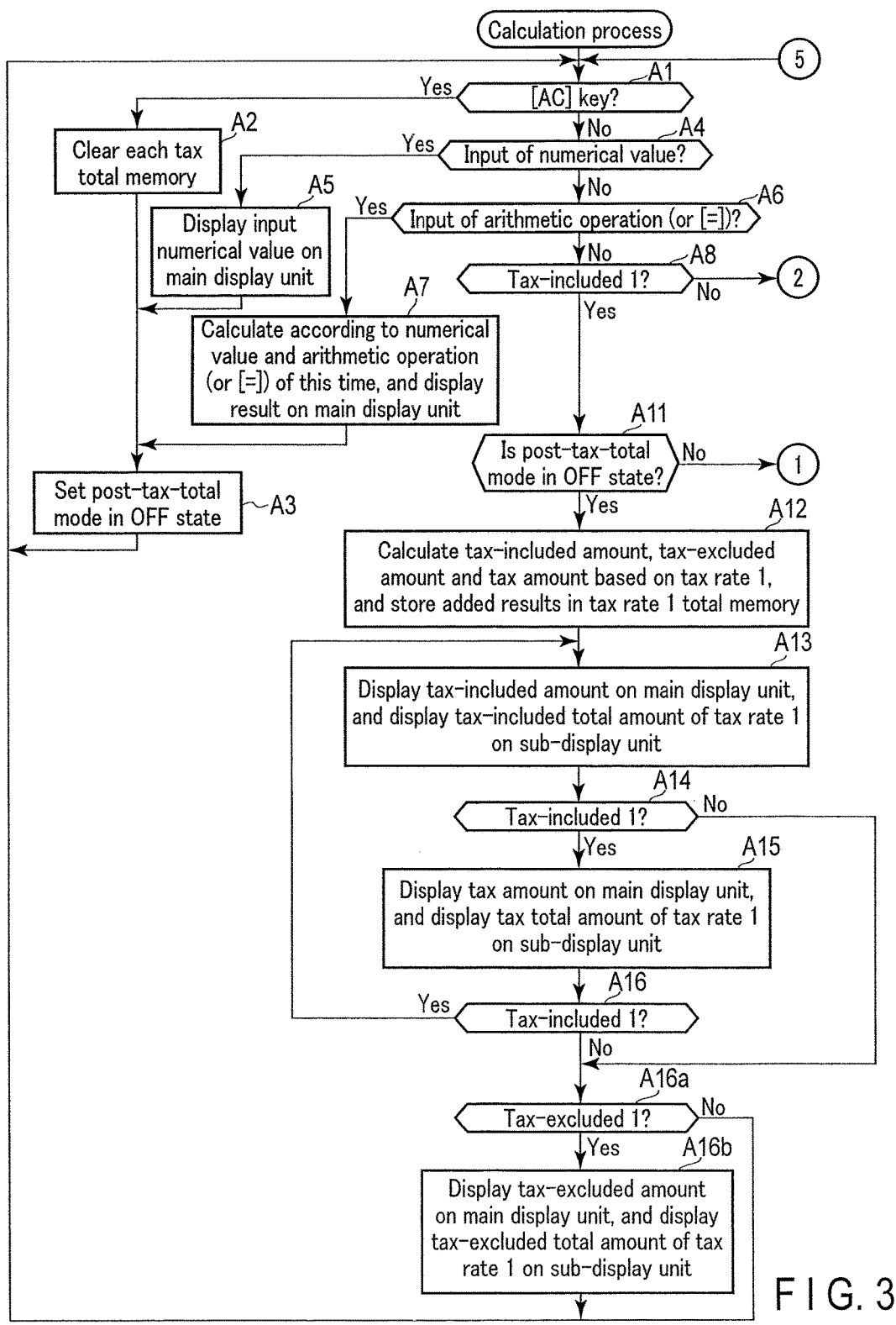
FIG. 3 is a flowchart (part 1) for describing the operation of a calculation function of the electronic calculator 10 in the embodiment.
Figure 4:
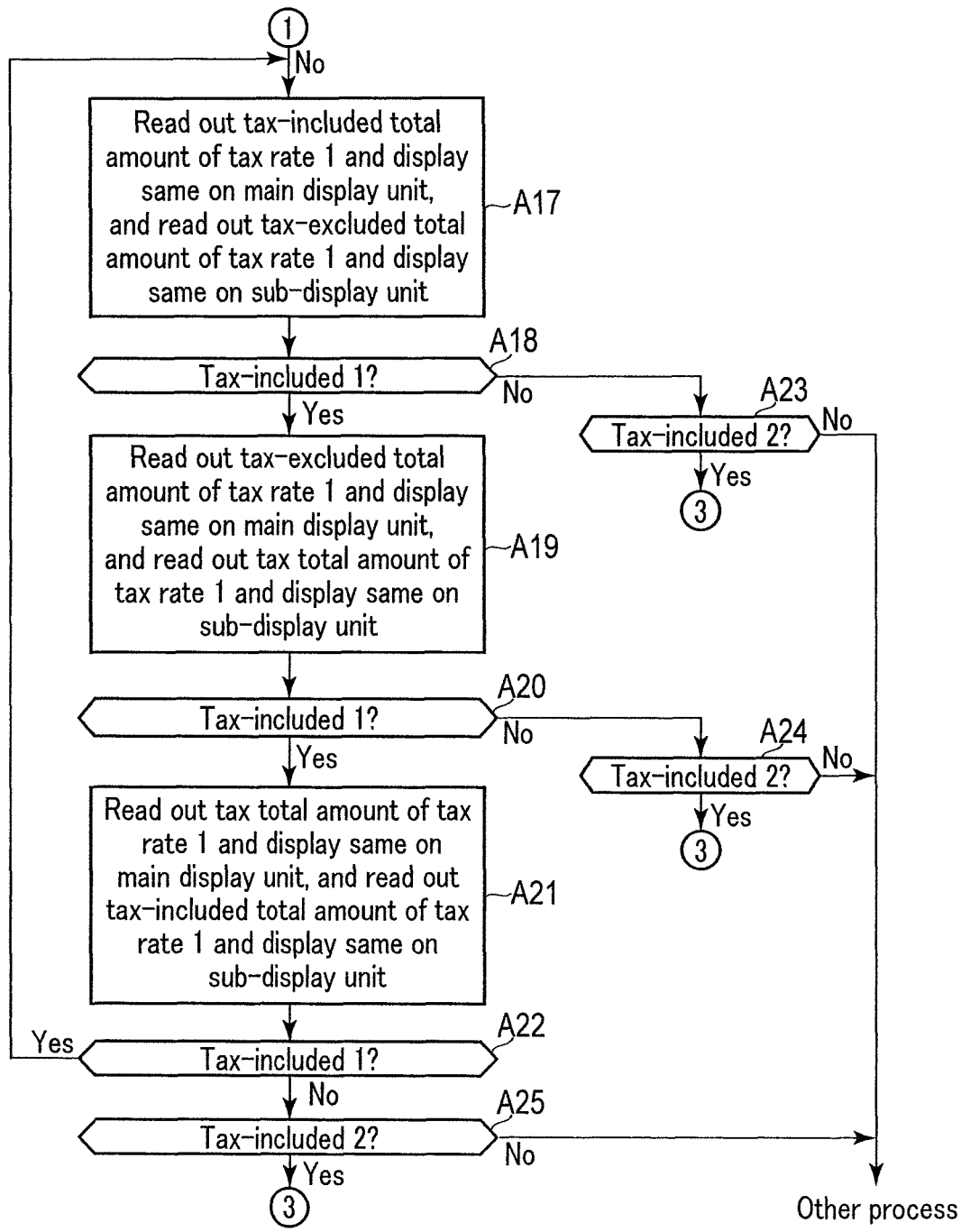
FIG. 4 is a flowchart (part 2) for describing the operation of the calculation function of the electronic calculator 10 in the embodiment.
Figure 5:
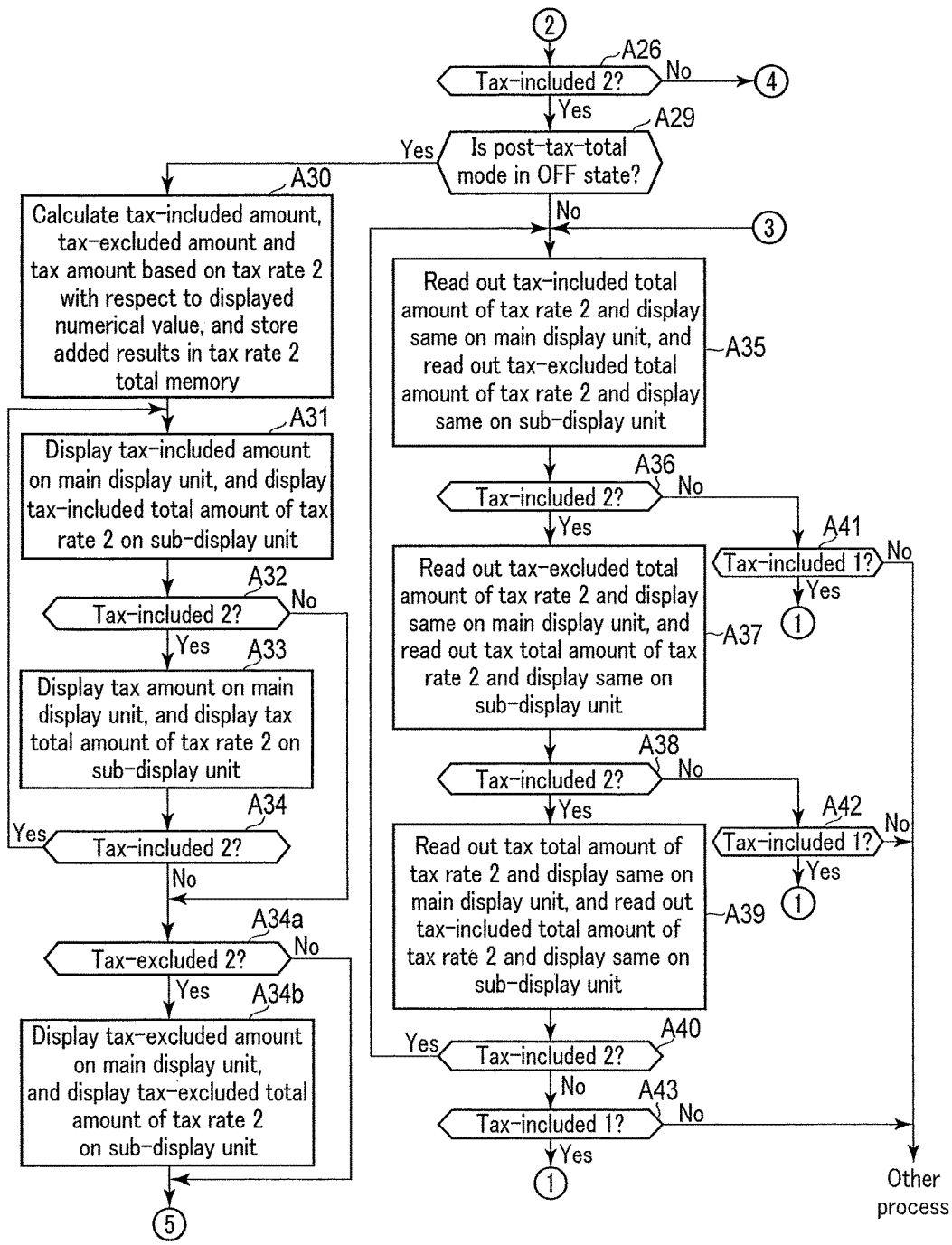
FIG. 5 is a flowchart (part 3) for describing the operation of the calculation function of the electronic calculator 10 in the embodiment.
Figure 6:
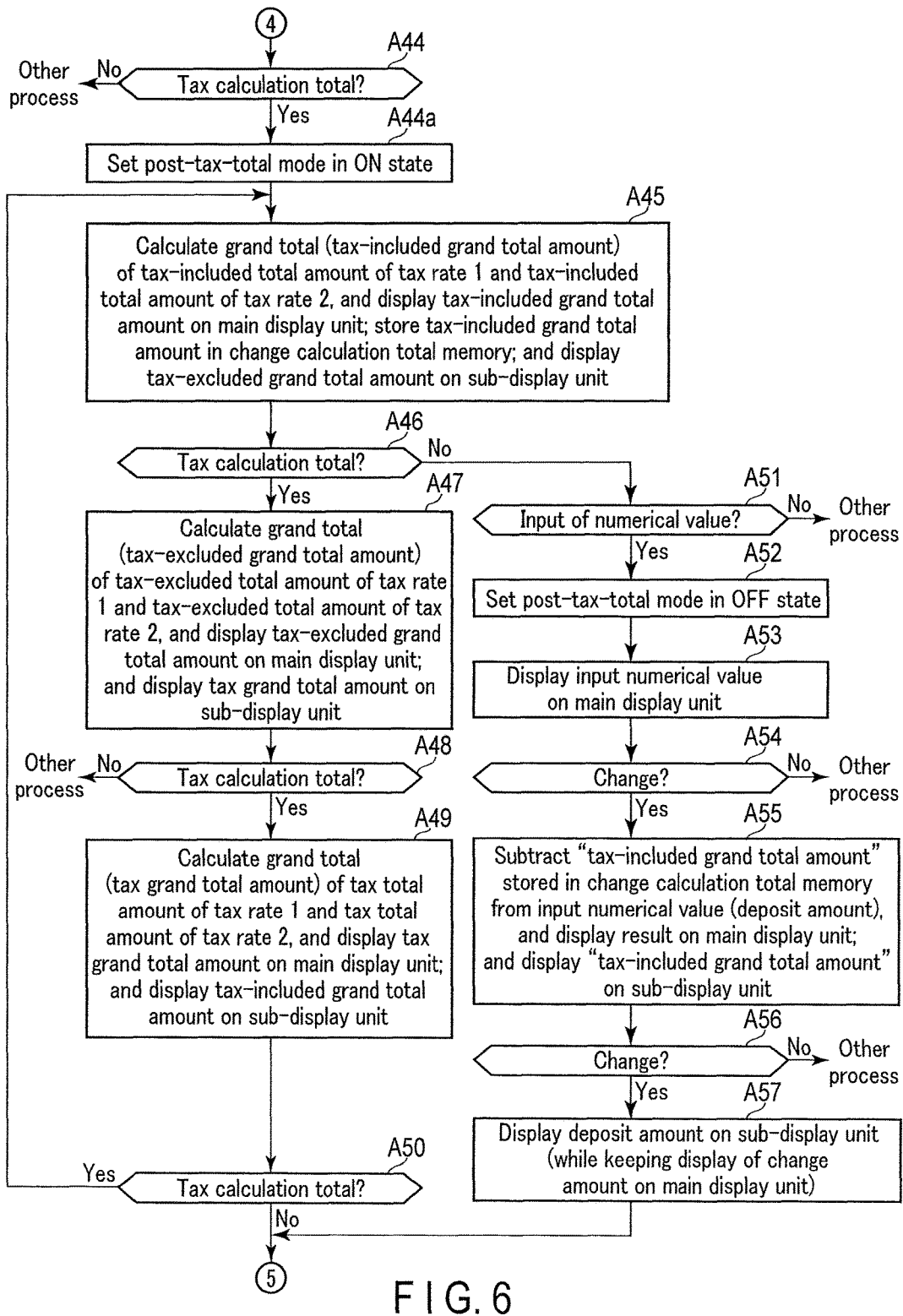
FIG. 6 is a flowchart (part 4) for describing the operation of the calculation function of the electronic calculator 10 in the embodiment.

Embodiments of the present invention will be described hereinafter with reference to the accompanying drawings.

FIG. 1 is a front view illustrating an external-appearance configuration of an electronic calculator 10 according to an embodiment of a tax calculation device of the present invention. In the present embodiment, the tax calculation device is realized as the electronic calculator 10 which is exclusively used for calculations.

In the meantime, the tax calculation device may be configured as, aside from the electronic calculator 10, a personal computer, a tablet computer, a smartphone, a mobile phone, a touch-panel PDA (personal digital assistants), an electronic book, a portable game console, etc., which include calculation functions (i.e. in which calculation process programs are installed). Incidentally, a calculation device, on which physical keys (buttons) such as those of electronic calculator 10 are not mounted, displays a software keyboard which is similar to the keys of the electronic calculator 10, and executes a calculation process in accordance with a key operation on this software keyboard.

The electronic calculator 10 in the embodiment includes a tax calculation function of performing tax calculations based on a plurality of tax rates (in the description below, two tax rates, namely a tax rate 1 (e.g. "8%") and a tax rate 2 (e.g. "10%")), and a change calculation function of calculating a change from a deposit amount with respect to a grand total amount of respective tax-included amounts of plural tax rates, which are calculated by the tax calculation function.

A key input unit 11 including a plurality of keys, a main display unit (main screen) 12, and a sub-display unit (sub-screen) 13 are provided on a front surface of the housing of the electronic calculator 10. The display area of the sub-display unit 13 is slightly smaller than the display area of the main display unit 12. The sub-display unit 13 is juxtaposed under the main display unit 12. A replaceable battery (not shown) is accommodated in the electronic calculator 10. In addition, a solar battery 14 is disposed on that surface of the electronic calculator 10, on which the main display unit 12 and sub-display unit 13 are provided. Calculation and display are enabled by either battery.

The key input unit 11 is provided with numeric keys, arithmetic keys, tax calculation function keys, a change calculation function key, and function keys. The numeric keys include, for example, a plurality of keys corresponding to [00], [0]~[9]. The arithmetic keys include, for example, a plurality of keys corresponding to an [+] (addition) key, a [−] (subtraction) key, [x] (multiplication) key, a [+] (division) key, and an [=] key. The tax calculation function keys include a tax-included 1 calculation key (first tax calculation key) 11b, a tax-included 2 calculation key (second tax calculation key) 11c, a tax-excluded 1 calculation key 11d, a tax-excluded 2 calculation key 11e, and a tax calculation total key (third tax calculation key) 11f. The change calculation function key includes a change key 11x. The function keys include, for example, an all-clear key ([AC] key 11a), a clear key ([C] key), a grand total key ([GT] key), and a percentage [%] key, as well as a "Δ" key 11g and a "∇" key 11h for transposing displayed data between the main display unit 12 and the sub-display unit 13.

In addition, the key input unit 11 includes a slide-type selector switch 11q (F, "CUT", "UP", "5/4") for designating a decimal fraction process, and an adjustment switch 11r (4, 3, 2, 1, 0, $ADD_2$) for adjusting the place of display of a decimal.

The adjustment switch 11r is a switch for setting a decimal, which is displayed on the display area (12,13), to an n-th place after the decimal point, by setting a slider to an n-th place (n is an integer of 0 to 4), except for the case in which the slider of the selector switch 11q is set at the position of "F". In addition, in the adjustment switch 11r, if the slider is set to "$ADD_2$", an input value or a calculated value is displayed by being multiplied by 0.01, when the calculation is an addition or subtraction, except for the case in which the slider of the selector switch 11q is set at the position of "F". When the calculation is a multiplication or division, an input value or calculated value is displayed up to two digits after the decimal point, regardless of the input/non-input of a decimal point key ".".

In the selector switch 11q, if the slider is set to the position of "F", when a calculation value is a decimal, the calculation value is displayed as a decimal up to a displayable number of digits on either the main display unit 12 or the sub-display unit 13 on which the calculation value is displayed. If the slider is set to the position of "CUT", when a calculation value is a decimal, the calculation value is displayed up to an n-th place after the decimal point on either the main display unit 12 or the sub-display unit 13 on which the calculation value is displayed, by omitting a part of an (n+1) or subsequent place after the decimal point, which is lower by one place than the n-th place that is set by the adjustment switch 11r. If the slider is set to the position of "UP", when a calculation value is a decimal, the calculation value is displayed up to an n-th place after the decimal point, as a carried-up value of the n-th place, on either the main display unit 12 or the sub-display unit 13 on which the calculation value is displayed, by omitting a part of an (n+1) or subsequent place after the decimal point, which is lower by one place than the n-th place that is set by the adjustment switch 11r, unless the part of the (n+1) or subsequent place is 0. If the slider is set to "5/4", when a calculation value is a decimal, a value up to an n-th place after the decimal point is displayed on the main display unit 12 or the sub-display unit 13. This value up to the n-th place is obtained by rounding a value of an (n+1) or subsequent place after the decimal point, which is lower by one place than the n-th place that is set by the adjustment switch 11r.

Each of the main display unit 12 and sub-display unit 13 is composed of a dot-matrix-type liquid crystal display unit. A numerical value, which is input by an operation on the key of the key input unit 11, and data of a calculation result, are displayed on each of the display units 12 and 13. A numerical value of a limited number of rows (e.g. one row) with 12 digits at maximum is displayed on each of the display units 12 and 13. In addition, characters and signs (symbols), which indicate a currently set-up calculation mode and various setting states, are displayed on a state display area which is provided along a side of each of the display units 12 and 13.

FIG. 2 is a block diagram illustrating the configuration of electronic circuitry of the electronic calculator 10 in the present embodiment. The electronic circuitry of the calculator 10 includes a plurality of units including a CPU (Central Processing Unit) 21, which constitute a computer.

The processor 21 controls the operations of the respective circuitry components by executing a calculation process program 22a which is stored in a memory 22. If an input operation is executed, the processor 21 detects a key on which the input operation was executed, based on a key input signal from the key input unit 11, and the processor 21 executes various calculation processes corresponding to keys which were detected. In the calculator 10, the processor 21 controls the operations of the respective circuitry components in accordance with instructions described in the calculation process program 22a, and software and hardware cooperatively operate to realize calculation processes including a process by a calculation function which will be described below in the operational explanation.

The calculation process program 22a may be prestored in the memory 22, or may be read in from an external storage medium 23, such as a memory card, via a storage medium read unit 24, or may be downloaded from a server 30 on a communication network N (including the Internet, etc.) via a communication unit 25.

The memory 22 includes, as well as an area storing the calculation process program 22a, areas storing various data, such as a tax rate 1 total memory area 22b, a tax rate 2 total memory area 22c, a tax total memory area 22d, and an area storing post-tax-total mode data 22e, and a change calculation total memory area 22f.

The tax rate 1 total memory area 22b is an area for storing data which is calculated by a tax calculation based on the tax rate 1. The tax rate 1 total memory area 22b stores a tax-included amount (first tax-included amount), a tax-excluded amount (first tax-excluded amount) and a tax amount (first tax amount) which were calculated by using the tax rate 1 with respect to at least one numerical value indicating a tax-excluded amount (first tax-excluded amount) which was input by an input operation of the key input unit 11. In addition, the tax rate 1 total memory area 22b stores a first tax-included total amount indicating a total of first tax-included amounts corresponding to at least one numerical value, a first tax-excluded total amount corresponding to the first tax-included total amount, and a first tax total amount corresponding to the first tax-included total amount.

The tax rate 2 total memory area 22c is an area for storing data which is calculated by a tax calculation based on the tax rate 2. The tax rate 2 total memory area 22c stores a tax-included amount (second tax-included amount), a tax-excluded amount (second tax-excluded amount) and a tax amount (second tax amount) which were calculated by using the tax rate 2 with respect to at least one numerical value indicating a tax-excluded amount (second tax-excluded amount) which was input by an input operation of the key input unit 11. In addition, the tax rate 2 total memory area 22c stores a second tax-included total amount indicating a total of second tax-included amounts corresponding to at least one numerical value, a second tax-excluded total amount corresponding to the second tax-included total amount, and a second tax total amount corresponding to the second tax-included total amount.

The tax total memory area 22d is an area for storing data indicating the total of the numerical value, which is calculated by the tax calculation based on the tax rate 1, and the numerical value, which is calculated by the tax calculation based on the tax rate 2. The tax total memory area 22d stores, in response to an input operation of the tax calculation total key 11f, a tax-included grand total amount in which the first tax-included total amount and the second tax-included total amount are added, a tax-excluded grand total amount corresponding to the tax-included grand total amount, and a tax grand total amount corresponding to the tax-included grand total amount.

The post-tax-total mode data 22e is data indicating whether the current state is a state after the tax-included grand total amount was calculated in response to the input operation of the tax calculation total key 11f (post-tax-total mode ON/OFF).

The post-tax-total mode is set in the ON state when the tax-included grand total amount was calculated, and the post-tax-total mode is set in the OFF state when a key other than the tax-included 1 calculation key 11b, tax-included 2 calculation key 11c and change key 11x, for instance, [AC] key 11a, was operated, or when a new numerical value was input by the operation of a numeric key.

When the post-tax-total mode is in the ON state (the state after the tax-included grand total amount was calculated), if the tax-included 1 calculation key 11b or tax-included 2 calculation key 11c is operated, the (first/second) tax-included total amount is displayed (tax-included total amount display control process). Then, each time the same key (the tax-included 1 calculation key 11b or tax-included 2 calculation key 11c) is operated, the tax-excluded total amount corresponding to the (first/second) tax-included total amount, and the tax total amount corresponding to the (first/second) tax-included total amount are successively displayed in a switched manner.

In addition, when the post-tax-total mode is in the OFF state (i.e. not in the state after the tax-included grand total amount was calculated), if the tax-included 1 calculation key 11b or tax-included 2 calculation key 11c is operated, the (first/second) tax-included amount in a case in which a displayed numerical value is a tax-excluded amount is displayed (tax-included amount display control process). Then, if the same key (the tax-included 1 calculation key 11b or tax-included 2 calculation key 11c) is operated, the (first/second) tax amount is displayed.

In the change calculation total memory area 22f, the tax-included grand total amount, which is calculated each time the tax calculation total key 11f is operated, is overwritten and stored.

Next, the operation of the electronic calculator 10 in this embodiment will be described. FIG. 3, FIG. 4, FIG. 5 and FIG. 6 are flowcharts for describing the operation of the calculation function of the electronic calculator 10 in the embodiment. FIG. 7, FIG. 8, FIG. 9 and FIG. 10 are views illustrating concrete examples of input operations and display for describing the tax calculation function and change calculation function of the electronic calculator 10 in the embodiment.

Here, the series of process steps of the tax calculation function will first be described, and then the change calculation function, which is executed with respect to the tax-included total amount, will be described.

(Tax Calculation Function)

In the present embodiment, in the default setting, "8%" is set as the tax rate 1, and "10%" is set as the tax rate 2.

To start with, in order to clear the display before starting a calculation, the user operates (depresses) the [AC] key 11a. If the [AC] key 11a is operated (step A1 (Yes)), the processor 21 clears each of the areas of the memory 22, which are used for tax calculation, that is, all of the tax rate 1 total memory area 22b, tax rate 2 total memory area 22c and tax total memory area 22d (step A2). In addition, the processor 21 sets the post-tax-total mode, which is stored in the post-tax-total mode data 22e, in the OFF state (step A3). Part (A) of FIG. 7 illustrates a display example in a case in which the [AC] key 11a was operated.

Next, if a numeric key is operated by the user in order to input a numerical value that is a target of calculation (step A4 (Yes)), the processor 21 inputs a numerical value (numerical value data) corresponding to the input-operated numeric key, and causes the main display unit (main screen) 12 to display the input numerical value (step A5). In addition, the processor 21 sets the post-tax-total mode, which is stored in the post-tax-total mode data 22e, in the OFF state (step A3). Subsequently, if an arithmetic key is operated (step A6 (Yes)), the processor 21 inputs an arithmetic operation (arithmetic data) corresponding to the input-operated arithmetic key, and displays the arithmetic (sign) symbol of the input arithmetic operation on the state display area of the main display unit 12 (step A7). In addition, the processor 21 sets the post-tax-total mode, which is stored in the post-tax-total mode data 22e, in the OFF state (step A3). Furthermore, the processor 21 executes an arithmetic operation, based on the input arithmetic data and the input numerical value data, and causes the main display unit 12 to display a result during the arithmetic operation. Subsequently, in the same manner, by the repetition of the input of the numerical value data and arithmetic data, the processor 21 successively stores the input numerical value data and arithmetic data. Then, if the "=" (equal) key is operated by the user operation, the processor 21 inputs arithmetic data corresponding to the input-operated arithmetic key ("=" key), executes a calculation corresponding to the numerical value data and arithmetic data ("=" data) which have been input thus far, and causes the main display unit 12 to display the calculation result (steps A4 to A7).

Thus, in the state in which the numerical value is displayed on the main display unit 12, if the input operation of the tax-included 1 calculation key 11b or tax-included 2 calculation key 11c is detected, the processor 21 executes a tax calculation based on the tax rate corresponding to the input-operated tax calculation key, with respect to the numerical value which indicates the tax-excluded amount and is displayed on the main display unit 12. In the meantime, in the above description, the numerical value displayed on the main display unit 12 is input (displayed) by the arithmetic operation. However, a numerical value, which was simply input by an input operation of a numeric key, can be set as a target of the tax calculation.

For example, if the processor 21 detects an input operation of the tax-included 1 calculation key 11b (step A8 (Yes)), since the post-tax-total mode is in the OFF state (step A11 (Yes)), the processor 21 calculates a tax-included amount and a tax amount, based on the tax rate 1 (e.g. "8%"), with respect to the displayed numerical value that is the target of the tax calculation, and stores the tax-included amount and tax amount, together with the tax-excluded amount indicated by the displayed numerical value, in the tax rate 1 total memory area 22b (step A12). At this time, since the currently calculated tax-included amount, tax-excluded amount and tax amount are added to the tax-included amount, tax-excluded amount and tax amount calculated thus far, and the added amounts are stored in the tax rate 1 total memory area 22b, the tax-included total amount, tax-excluded total amount and tax total amount of the tax rate 1 are also stored as a result. In addition, the processor 21 causes the main display unit 12 to display the tax-included amount that was calculated based on the tax rate 1, and causes the sub-display unit (sub-screen) 13 to display the tax-included total amount of the tax rate 1 (step A13).

Similarly, in the state in which a numerical value input by the operation of a numeric key (or a numerical value calculated by an arithmetic operation) is displayed on the main display unit 12 (steps A4 to A7), if the processor 21 detects an input operation of the tax-included 1 calculation key 11b (step A8 (Yes)), the processor 21 executes a tax calculation based on the tax rate 1, with respect to the displayed numerical value that is displayed on the main display unit 12, stores the calculation result in the tax rate 1 total memory area 22b, causes the main display unit 12 to display the tax-included amount, and causes the sub-display unit 13 to display the tax-included total amount of the tax rate 1 (steps A8 to A13). Specifically, tax calculations for a plurality of numerical values can be successively instructed.

In addition, if the processor 21 detects an input operation of the tax-included 2 calculation key 11c (step A26 (Yes)), since the post-tax-total mode is in the OFF state (step A29 (Yes)), the processor 21 calculates a tax-included amount and a tax amount, based on the tax rate 2 (e.g. "10%"), with respect to the displayed numerical value that is the target of the tax calculation, and stores the tax-included amount and tax amount, together with the tax-excluded amount indicated by the displayed numerical value, in the tax rate 2 total memory area 22c (step A30). In addition, the processor 21 causes the main display unit 12 to display the tax-included amount that was calculated based on the tax rate 2, and causes the sub-display unit 13 to display the tax-included total amount of the tax rate 2 (step A31). Similarly, in the state in which a numerical value input by the operation of a numeric key (or a numerical value calculated by an arithmetic operation) is displayed on the main display unit 12 (steps A4 to A7), if the processor 21 detects an input operation of the tax-included 2 calculation key 11c (step A26 (Yes)), the processor 21 executes a tax calculation based on the tax rate 2, with respect to the displayed numerical value that is displayed on the main display unit 12, stores the calculation result in the tax rate 2 total memory area 22c, causes the main display unit 12 to display the tax-included amount, and causes the sub-display unit 13 to display the tax-included total amount of the tax rate 2 (steps A26 to A31).

Next, concrete examples of the input of numerical values and the tax calculations will be described. FIG. 7 is a view illustrating examples of a numerical value (tax-excluded amount) that is input, a tax-included amount, and a tax amount, which are used in the description below of the tax calculation function.

For example, as illustrated in part (B) of FIG. 7, if a numerical value "100" is input (step A4 (Yes), A5) and then the tax-included 1 calculation key 11b is operated (step A8 (Yes)), the processor 21 causes the main display unit 12 to display a tax-included amount "108" that was calculated based on the tax rate 1, and causes the sub-display unit 13 to display a tax-included total amount "108" of the tax rate 1 (in this case, since the tax-included amount was first calculated based on the tax rate 1, the tax-included total amount is equal to the tax-included amount) (step A11 (Yes), A12, A13). In addition, the processor 21 causes the main display unit 12 to display symbols "Tax 1" and "Tax-included" which indicate that the tax-included amount calculated based on the tax rate 1 is displayed, and causes the sub-display unit 13 to display symbols "Grand total", "Tax 1" and "Tax-included" which indicate that the tax-included total amount calculated based on the tax rate 1 is displayed. Similarly, as illustrated in part (C) of FIG. 7, if a numerical value "200" is input and then the tax-included 1 calculation key 11b is operated, the processor 21 causes the main display unit 12 to display a tax-included amount "216" that was calculated based on the tax rate 1 with respect to the numerical value "200", and causes the sub-display unit 13 to display a tax-included total amount "324" of the tax rate 1.

The result of the tax calculation with respect to the numerical value "200" is stored in the tax rate 1 total memory area 22b (step A12).

In the meantime, in the state in which the tax-included amount and the tax-included total amount are displayed on the main display unit 12 and sub-display unit 13, respectively, if the key (tax-included 1 calculation key 11b or tax-included 2 calculation key 11c), which was operated in order to instruct the tax calculation, is successively operated, the display of the tax-included amount and tax-included total amount is switched to the display of the tax amount and tax total amount.

For example, when the tax-included amount "216" and tax-included total amount "324", which were calculated based on the tax rate 1, are displayed on the main display unit 12 and sub-display unit 13 as illustrated in part (C) of FIG. 7 (step A13), if the tax-included 1 calculation key 11b is operated as illustrated in part (D) of FIG. 7 (step A14 (Yes)), the processor 21 reads out a tax amount "16", which was calculated based on the tax rate 1, from the tax rate 1 total memory area 22b, and causes the main display unit 12 to display the tax amount "16", and reads out a tax total amount "24" of the tax rate 1 from the tax rate 1 total memory area 22b, and causes the sub-display unit 13 to display the tax total amount "24" (step A15). Furthermore, as illustrated in part (E) of FIG. 7, if the tax-included 1 calculation key 11b is successively operated (step A16 (Yes)), the processor 21 causes the main display unit 12 to display the tax-included amount "216" that was calculated based on the tax rate 1, and causes the sub-display unit 13 to display the tax-included total amount "324" of the tax rate 1 (step A13).

Here, as illustrated in part (F) of FIG. 7, if the tax-excluded 1 calculation key 11d is operated (step A16a (Yes)), the processor 21 reads out a tax-excluded amount "200", which was calculated based on the tax rate 1, from the tax rate 1 total memory area 22b, and causes the main display unit 12 to display the tax-excluded amount "200", and reads out a tax-excluded total amount "300" of the tax rate 1 from the tax rate 1 total memory area 22b, and causes the sub-display unit 13 to display the tax-excluded total amount "300" (step A16b).

Besides, as illustrated in part (A) of FIG. 8, if a numerical value "500" is input (step A4 (Yes), A5) and then the tax-included 2 calculation key 11c is operated (step A26 (Yes)), the processor 21 causes the main display unit 12 to display a tax-included amount "550" that was calculated based on the tax rate 2, and causes the sub-display unit 13 to display a tax-included total amount "550" of the tax rate 2 (in this case, since the tax-included amount was first calculated based on the tax rate 2, the tax-included total amount is equal to the tax-included amount) (step A29 (Yes), A30, A31). In addition, the processor 21 causes the main display unit 12 to display symbols "Tax 2" and "Tax-included" which indicate that the tax-included amount calculated based on the tax rate 2 is displayed, and causes the sub-display unit 13 to display symbols "Grand total", "Tax 2" and "Tax-included" which indicate that the tax-included total amount calculated based on the tax rate 2 is displayed. Similarly, as illustrated in part (B) of FIG. 8, if a numerical value "200" is input and then the tax-included 2 calculation key 11c is operated, the processor 21 causes the main display unit 12 to display a tax-included amount "220" that was calculated based on the tax rate 2 with respect to the numerical value "200", and causes the sub-display unit 13 to display a tax-included total amount "770" of the tax rate 2.

The result of the tax calculation with respect to the numerical value "200" is stored in the tax rate 2 total memory area 22c (step A30).

In addition, when the tax-included amount "220" and tax-included total amount "770", which were calculated based on the tax rate 2, are displayed on the main display unit 12 and sub-display unit 13 as illustrated in part (B) of FIG. 8 (step A31), if the tax-included 2 calculation key 11c is operated as illustrated in part (C) of FIG. 8 (step A32 (Yes)), the processor 21 reads out a tax amount "20", which was calculated based on the tax rate 2, from the tax rate 2 total memory area 22c, and causes the main display unit 12 to display the tax amount "20", and reads out a tax total amount "70" of the tax rate 2 from the tax rate 2 total memory area 22c, and causes the sub-display unit 13 to display the tax total amount "70" (step A33). Furthermore, as illustrated in part (D) of FIG. 8, if the tax-included 2 calculation key 11c is successively operated (step A34 (Yes)), the processor 21 causes the main display unit 12 to display the tax-included amount "220" that was calculated based on the tax rate 2, and causes the sub-display unit 13 to display the tax-included total amount "770" of the tax rate 2 (step A31).

Here, as illustrated in part (E) of FIG. 8, if the tax-excluded 2 calculation key 11e is operated (step A34a (Yes)), the processor 21 reads out a tax-excluded amount "200", which was calculated based on the tax rate 2, from the tax rate 2 total memory area 22c, and causes the main display unit 12 to display the tax-excluded amount "200", and reads out a tax-excluded total amount "700" of the tax rate 2 from the tax rate 2 total memory area 22c, and causes the sub-display unit 13 to display the tax-excluded total amount "700" (step A34b).

In this manner, in the electronic calculator 10, by the operation of the tax-included 1 calculation key 11b or tax-included 2 calculation key 11c with respect to the input numerical value (tax-excluded amount), the tax-included amount based on each tax rate can be displayed on the main display unit 12, and the tax-included total amount of the corresponding tax rate can be displayed on the sub-display unit 13. Thus, by the very simple operation, while the tax-included amount of the tax rate 1 or tax rate 2 is successively calculated and displayed on the main display unit 12, the tax-included total amount of each corresponding tax rate can be displayed on the sub-display unit 13.

In addition, in the electronic calculator 10, in accordance with the operation of the tax-included 1 calculation key 11b or tax-included 2 calculation key 11c, the tax-included amount of the corresponding tax rate is displayed on the main display unit 12, and the tax-included total amount is displayed on the sub-display unit 13. Thereafter, each time the tax-included 1 calculation key 11b or tax-included 2 calculation key 11c is operated, the tax-included amount and tax amount can be switchedly displayed on the main display unit 12, and the tax-included total amount and tax total amount can be switchedly displayed on the sub-display unit 13. Therefore, the tax-included amount and tax-included total amount, and the tax amount and tax total amount, which are calculated based on each of the tax rates, can easily be confirmed.

Next, when the tax calculation total key 11f (third tax calculation key) is operated (step A44 (Yes)), the processor 21 sets the post-tax-total mode, which is stored in the post-tax-total mode data 22e, in the ON state (step A44a). Then, the processor 21 calculates a tax-included grand total amount in which a total (first tax-included total amount) of the tax-included amounts, which were calculated based on the tax rate 1 and stored in the tax rate 1 total memory area 22b, and a total (second tax-included total amount) of the tax-included amounts, which were calculated based on the tax rate 2 and stored in the tax rate 2 total memory area 22c, are added, and the processor 21 stores the tax-included grand total amount in the tax total memory area 22d, and causes the main display unit 12 to display the tax-included grand total amount (step A45).

In addition, the processor 21 calculates a tax-excluded grand total amount in which a total (first tax-excluded total amount) of the tax-excluded amounts, which were calculated based on the tax rate 1 and stored in the tax rate 1 total memory area 22b, and a total (second tax-excluded total amount) of the tax-excluded amounts, which were calculated based on the tax rate 2 and stored in the tax rate 2 total memory area 22c, are added, and the processor 21 stores the tax-excluded grand total amount in the tax total memory area 22d, and causes the sub-display unit 13 to display the tax-excluded grand total amount (step A45).

Here, the calculated and displayed tax-included grand total amount is overwritten and stored in the change calculation total memory area 22f (step A45).

In addition, by successively operating the tax calculation total key 11f in the state in which the tax-included grand total amount and tax-excluded grand total amount are displayed on the main display unit 12 and sub-display unit 13, the electronic calculator 10 can successively change the display of the tax-included grand total amount and tax-excluded grand total amount, to the display of the tax-excluded grand total amount and tax grand total amount, and to the tax grand total amount and tax-included grand total amount.

When the tax-included grand total amount is displayed on the main display unit 12 and the tax-excluded grand total amount is displayed on the sub-display unit 13 (step A45), if the tax calculation total key 11f (third tax calculation key) is operated (step A46 (Yes)), the processor 21 calculates the tax-excluded grand total amount and tax grand total amount which correspond to the tax-included grand total amount, based on the data stored in the tax rate 1 total memory area 22b and tax rate 2 total memory area 22c, and the processor 21 stores the calculated tax-excluded grand total amount and tax grand total amount in the tax total memory area 22d. In addition, the processor 21 reads out the tax-excluded grand total amount and tax grand total amount from the tax total memory area 22d, and causes the main display unit 12 and sub-display unit 13 to display the tax-excluded grand total amount and tax grand total amount, respectively (step A47).

Furthermore, when the tax-excluded grand total amount is displayed on the main display unit 12 and the tax grand total amount is displayed on the sub-display unit 13 (step A47), if the tax calculation total key 11f (third tax calculation key) is operated (step A48 (Yes)), the processor 21 calculates the tax grand total amount and tax-included grand total amount, based on the data stored in the tax rate 1 total memory area 22b and tax rate 2 total memory area 22c, and the processor 21 stores the calculated tax grand total amount and tax-included grand total amount in the tax total memory area 22d. In addition, the processor 21 reads out the tax grand total amount and tax-included grand total amount from the tax total memory area 22d, and causes the main display unit 12 and sub-display unit 13 to display the tax grand total amount and tax-included grand total amount, respectively (step A49).

Moreover, if the tax calculation total key 11f is operated (step A50 (Yes)), the processor 21 causes the main display unit 12 and sub-display unit 13 to display the tax-included grand total amount and tax-excluded grand total amount, respectively, and the processor 21 overwrites and stores the tax-included grand total amount in the change calculation total memory area 22f (step A45).

Specifically, the electronic calculator 10 calculates the tax-included grand total amount and tax-excluded grand total amount in accordance with the operation of the tax calculation total key 11f. Thereafter, each time the tax calculation total key 11f (third tax calculation key) is operated, the main display unit 12 and sub-display display unit 13 can successively display, in a twitched manner, the tax-included grand total amount and tax-excluded grand total amount, the tax-excluded grand total amount and tax grand total amount, and the tax grand total amount and tax-included grand total amount. It is thus possible to easily confirm, by comparison, the tax-excluded grand total amount in relation to the tax-included grand total amount, the tax grand total amount in relation to the tax-excluded grand total amount, and the tax-included grand total amount in relation to the tax grand total amount.

Figure 9:
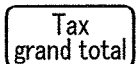
FIG. 9 is a view illustrating a concrete example (part 3) of the input operation and display for describing the tax calculation function of the electronic calculator 10 in the embodiment.

Part (A) of FIG. 9 to part (C) of FIG. 9 illustrate display examples in the case in which the tax calculation total key 11f (third tax calculation key) was operated. If the tax calculation total key 11f is operated (step A44 (Yes)) after the tax calculations (step A8 to A12/step A26 to A30) were executed with respect to the plural numerical values illustrated in the above-described parts (B) and (C) of FIG. 7 and parts (A) and (B) of FIG. 8, the processor 21 calculates, as illustrated in part (A) of FIG. 9, a tax-included grand total amount "1094" which indicates the grand total amount of the tax-included amounts to which the tax rate 1 and tax rate 2 are applied, and a tax-excluded grand total amount "1000" which indicates the grand total amount of the tax-excluded amounts, and the processor 21 causes the main display unit 12 and sub-display unit 13 to display the tax-included grand total amount "1094" and tax-excluded grand total amount "1000", respectively. In addition, the processor 21 stores the tax-included grand total amount "1094" in the change calculation total memory 22f (step A45).

Here, as illustrated in part (B) of FIG. 9, if the tax calculation total key 11f is operated (step A46 (Yes)), the processor 21 calculates the tax-excluded grand total amount "1000" and tax grand total amount "94", and causes the main display unit 12 and sub-display unit 13 to display the tax-excluded grand total amount "1000" and tax grand total amount "94", respectively (step A47). Furthermore, as illustrated in part (C) of FIG. 9, if the tax calculation total key 11f is operated (step A48 (Yes)), the processor 21 calculates the tax grand total amount "94" and tax-included grand total amount "1094", and causes the main display unit 12 and sub-display unit 13 to display the tax grand total amount "94" and tax-included grand total amount "1094", respectively (step A49).

Next, a description will be given of a case in which the tax-included 1 calculation key 11b or tax-included 2 calculation key 11c is operated after the post-tax-total mode was set in the ON state (after the tax-included grand total amount was calculated).

As illustrated in part (A) of FIG. 9 to part (C) of FIG. 9, the tax-included grand total amount and tax-excluded grand total amount, the tax-excluded grand total amount and tax grand total amount, or the tax grand total amount and tax-included grand total amount are displayed on the main display unit 12 and sub-display unit 13. In this state, if the tax-included 1 calculation key 11b is operated (step A8 (Yes)), since the post-tax-total mode is in the ON state (step A11 (No)), the processor 21 reads out the first tax-included total amount, which indicates the total of the first tax-included amounts corresponding to at least one numerical value, and the first tax-excluded total amount, which indicates the total of the first tax-excluded amounts, from the tax rate 1 total memory area 22*b*, and the processor 21 causes the main display unit 12 and sub-display unit 13 to display the first tax-included total amount and first tax-excluded total amount (step A17).

Furthermore, in the state in which the first tax-included total amount and first tax-excluded total amount are displayed on the main display unit 12 and sub-display unit 13 (step A17), if the tax-included 1 calculation key 11*b* is operated (step A18 (Yes)), the processor 21 reads out the first tax-excluded total amount and first tax total amount, which correspond to the first tax-included total amount, from the tax rate 1 total memory area 22*b*, and the processor 21 causes the main display unit 12 and sub-display unit 13 to display the first tax-excluded total amount and first tax total amount (step A19).

Besides, in the state in which the first tax-excluded total amount and first tax total amount are displayed on the main display unit 12 and sub-display unit 13, if the tax-included 1 calculation key 11*b* is operated (step A20 (Yes)), the processor 21 reads out the first tax total amount and first tax-included total amount from the tax rate 1 total memory area 22*b*, and the processor 21 causes the main display unit 12 and sub-display unit 13 to display the first tax total amount and first tax-included total amount (step A21).

Specifically, after the tax-included grand total amount was calculated, the electronic calculator 10 can change, each time the tax-included 1 calculation key 11*b* is operated, the display state to the display of the first tax-included total amount and first tax-excluded total amount calculated based on the tax rate 1, to the display of the first tax-excluded total amount and first tax total amount, or to the display of the first tax total amount and first tax-included total amount, by using the main display unit 12 and sub-display display unit 13. It is thus possible to easily confirm, by comparison, the first tax-included total amount and first tax-excluded total amount, the first tax-excluded total amount and first tax total amount, and the first tax total amount and first tax-included total amount.

Part (D) of FIG. 9 to part (F) of FIG. 9 illustrate display examples in the case in which the tax-included 1 calculation key 11*b* was operated. In the display state illustrated in part (A) of FIG. 9 to part (C) of FIG. 9, if the tax-included 1 calculation key 11*b* is operated as illustrated in part (D) of FIG. 9 (step A8 (Yes)), the processor 21 reads out the first tax-included total amount "324" and first tax-excluded total amount "300", which were calculated based on the tax rate 1, from the tax rate 1 total memory area 22*b*, and the processor 21 causes the main display unit 12 and sub-display unit 13 to display the first tax-included total amount "324" and first tax-excluded total amount "300" (step A17).

Here, as illustrated in part (E) of FIG. 9, if the tax-included 1 calculation key 11*b* is operated (step A18 (Yes)), the processor 21 reads out the first tax-excluded total amount "300" and first tax total amount "24" from the tax rate 1 total memory area 22*b*, and the processor 21 causes the main display unit 12 and sub-display unit 13 to display the first tax-excluded total amount "300" and first tax total amount "24" (step A19).

Besides, as illustrated in part (F) of FIG. 9, if the tax-included 1 calculation key 11*b* is operated (step A20 (Yes)), the processor 21 reads out the first tax total amount "24" and first tax-included total amount "324" from the tax rate 1 total memory area 22*b*, and the processor 21 causes the main display unit 12 and sub-display unit 13 to display the first tax total amount "24" and first tax-included total amount "324" (step A21).

In the meantime, in the display state illustrated in part (D) of FIG. 9 to part (F) of FIG. 9, if the tax-included 2 calculation key 11*c* is operated (step A23, A24, A25 (Yes)), the processor 21 changes the display state to the display of the second tax-included total amount illustrated in part (G) of FIG. 9 (step A35).

Specifically, as illustrated in part (G) of FIG. 9, if the tax-included 2 calculation key 11*c* is operated (step A25 (Yes)), the processor 21 reads out the second tax-included total amount "770" and second tax-excluded total amount "700", which were calculated based on the tax rate 2, from the tax rate 2 total memory area 22*c*, and the processor 21 causes the main display unit 12 and sub-display unit 13 to display the second tax-included total amount "770" and second tax-excluded total amount "700" (step A35).

Subsequently, although not illustrated, if the tax-included 2 calculation key 11*c* is operated (step A36 (Yes)), the processor 21 reads out the second tax-excluded total amount "700" and second tax total amount "70", which correspond to the second tax-included total amount "770", from the tax rate 2 total memory area 22*c*, and the processor 21 causes the main display unit 12 and sub-display unit 13 to display the second tax-excluded total. amount "700" and second tax total amount "70" (step A37). Besides, in the state in which the second tax-excluded total amount and second tax total amount are displayed, if the tax-included 2 calculation key 11*c* is operated (step A38 (Yes)), the processor 21 reads out the second tax total amount "70" and second tax-included total amount "770" from the tax rate 2 total memory area 22*c*, and the processor 21 causes the main display unit 12 and sub-display unit 13 to display the second tax total amount "70" and second tax-included total amount "770" (step A39).

Specifically, after the tax-included grand total amount was calculated, the electronic calculator 10 can change, each time the tax-included 2 calculation key 11*c* is operated, the display state to the display of the second tax-included total amount and second tax-excluded total amount calculated based on the tax rate 2, to the display of the second tax-excluded total amount and second tax total amount, or to the display of the second tax total amount and second tax-included total amount, by using the main display unit 12 and sub-display display unit 13. It is thus possible to easily confirm, by comparison, the second tax-included total amount and second tax-excluded total amount, the second tax-excluded total amount and second tax total amount, and the second tax total amount and second tax-included total amount.

In the display state of the second tax-included total amount and second tax-excluded total amount illustrated in the above-described part (G) of FIG. 9, or in the display state of the second tax-excluded total amount and second tax total amount, or in the display state of the second tax total amount and second tax-included total amount, if the tax-included 1 calculation key 11*b* is operated (step A41, A42, A43 (Yes)), the processor 21 changes the display state to the display of the first tax-included total amount illustrated in part (D) of FIG. 9 to part (F) of FIG. 9 (step A17).

Specifically, while the post-tax-total mode is in the ON state, the electronic calculator 10 can switchedly display the two total displays (part (D) of FIG. 9 to part (G) of FIG. 9) corresponding to the tax rate 1 and tax rate 2 with use of the man display unit 12 and sub-display unit 13, by the simple operation of the tax-included 1 calculation key 11*b* and tax-included 2 calculation key 11*c*.

Thus, in the electronic calculator 10 in the present embodiment, by the simple operation using the tax-included 1 calculation key 11*b* and tax-included 2 calculation key 11*c* corresponding to a plurality of tax rates, the tax calculations based on the plural tax rates can be performed, and the contents of the tax calculations can easily be confirmed.

(Change Calculation Function)

Figure 10:
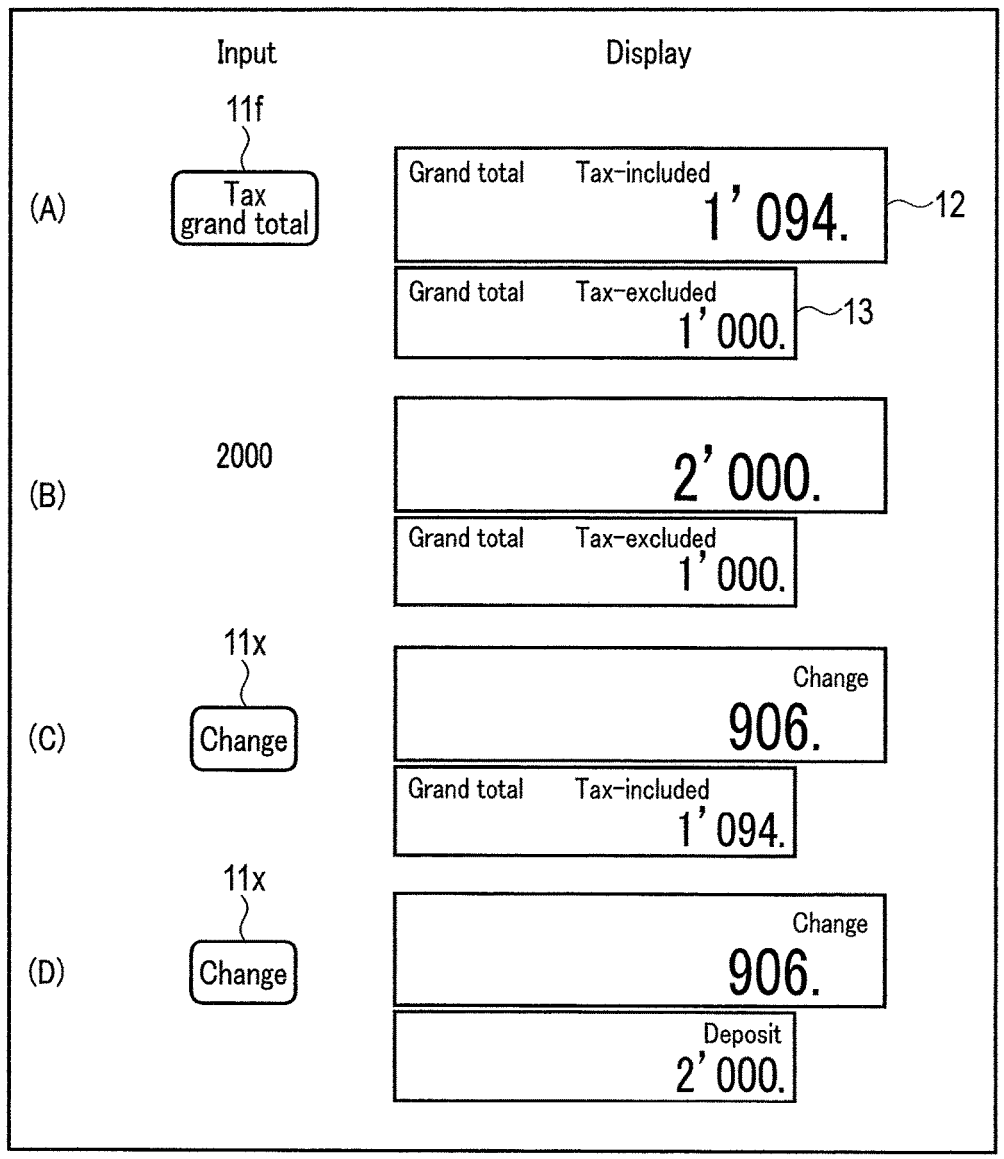
FIG. 10 is a view illustrating a concrete example of an input operation and display for describing a change calculation function of the electronic calculator 10 in the embodiment.

FIG. 10 illustrates a display example of a change calculation which is performed with respect to the tax-included grand total amount by the tax calculations illustrated in FIG. 7, FIG. 8 and FIG. 9.

As illustrated in part (A) of FIG. 10, by the operation of the tax calculation total key 11*f* (step A44 (Yes)), the tax-included grand total amount "1094" is displayed on the main display unit 12 and stored in the change calculation total memory 22*f*, and the tax-excluded grand total amount "1000" is displayed on the sub-display unit 13 (step A45). In this state, a numerical value "2000" is input as a deposit amount, as illustrated in part (B) of FIG. 10 (step A51 (Yes)).

Then, the processor 21 sets the post-tax-total mode in the OFF state (step A52), and causes the main display unit 12 to display the input numerical value (deposit amount) "2000" (step A53).

In addition, as illustrated in part (C) of FIG. 10, if the change key 11*x* is operated (step A54 (Yes)), the processor 21 subtracts the tax-included grand total amount "1094", which is stored in the change calculation total memory 22*f*, from the input numerical value (deposit amount) "2000". The processor 21 causes the main display unit 12 to display a subtraction result (change amount) "906", and causes the sub-display unit 13 to display the tax-included grand total amount "1094" (step A55).

Thereby, the deposit amount can be input with respect to the tax-included grand total amount that is the grand total of the first tax-included total amount and second tax-included total amount, which were calculated based on the respective tax rates (tax rate 1/tax rate 2), and the change amount, which is calculated by subtracting the tax-included grand total amount from the deposit amount, can easily be displayed on the main display unit 12. Moreover, the change amount can be confirmed in comparison with the tax-included grand total amount which is displayed on the sub-display unit 13.

Thereafter, as illustrated in part (D) of FIG. 10, if the change key 11*x* is successively operated (step A56 (Yes)), the processor 21 causes the sub-display unit 13 to display the deposit amount "2000", while keeping the display of the change amount "906" on the main display unit 12 (step A57).

Thereby, with use of the main display unit 12 and sub-display unit 13, the comparative display of the change amount, which is compared to the tax-included grand total amount, can easily be switched to the comparative display of the change amount, which is compared to the deposit amount, and these amounts can be confirmed.

Thus, according to the electronic calculator 10 with the above-described configuration, if the numerical value data (tax-excluded amount) is input and the tax-included 1 calculation key (first tax calculation key) 11*b* or tax-included 2 calculation key (second tax calculation key) 11*c* is operated, the tax-included amount data (first or second tax-included amount data), which was calculated based on the tax rate 1 or tax rate 2 with respect to the input numerical value data (tax-excluded amount), the tax-excluded amount data (first or second tax-excluded amount data), and the tax amount data (first or second tax amount data) are calculated, and are respectively added and stored in the tax rate 1 total memory area 22*b* or tax rate 2 total memory area 22*c* as the tax-included total amount data (first or second tax-included total amount data), the tax-excluded total amount data (first or second tax-excluded total amount data), and the tax total amount data (first or second tax total amount data). In addition, the calculated first or second tax-included amount data is displayed on the main display unit 12, and the stored first or second tax-included total amount data is displayed on the sub-display unit 13.

Thereby, by the very simple operation, the tax-included amount data with respect to the input numerical value data (tax-excluded amount) can be calculated based on each of the tax rates. While the tax-included amount data is being displayed on the main display unit 12, the tax-included total amount based on the corresponding tax rate can be displayed on the sub-display unit 13, and these amounts can easily be confirmed.

In addition, according to the electronic calculator 10 with the above-described configuration, the tax-included amount data based on each of the tax rates is calculated, and this tax-included amount data is displayed on the main display unit 12, while the tax-included total amount data of the corresponding tax rate is displayed on the sub-display unit 13. Thereafter, if the tax calculation total key (third tax calculation key) 11*f* is operated, the tax-included grand total amount data and tax-excluded grand total amount data are calculated, respectively, by grand-totaling the tax-included total amount data and tax-excluded total amount data, which are based on the respective tax rates and are stored in the tax rate 1 total memory area 22*b* and tax rate 2 total memory area 22*c*. In addition, the calculated tax-included grand total amount data and tax-excluded grand total amount data are displayed on the main display unit 12 and sub-display unit 13.

Thereby, by the very simple operation, it is possible to easily confirm, by comparison, the tax-included grand total amount data calculated by grand-totaling the tax-included total amount data of the plural tax rates, and the tax-excluded grand total amount data corresponding to this tax-included grand total amount data.

Additionally, according to the electronic calculator 10 with the above-described configuration, in accordance with the operation of the tax calculation total key 11*f*, the tax-included grand total amount data and tax-excluded grand total amount data based on the tax rates 1 and 2 are displayed on the main display unit 12 and sub-display unit 13. Thereafter, if the tax calculation total key 11*f* is successively operated, the tax-excluded grand total amount data and tax grand total amount data are calculated, respectively, by grand-totaling the tax-excluded total amount data and tax total amount data, which are based on the respective tax rates and are stored in the tax rate 1 total memory area 22*b* and tax rate 2 total memory area 22*c*. In addition, the calculated tax-excluded grand total amount data and tax grand total amount data are displayed on the main display unit 12 and sub-display unit 13.

Thereby, by the very simple operation, the comparative display of the tax-included grand total amount data and tax-excluded grand total amount data can be switched to the comparative display of the tax-excluded grand total amount data and tax grand total amount data, and these amounts can be confirmed.

Additionally, according to the electronic calculator 10 with the above-described configuration, in accordance with the operation of the tax calculation total key 11*f*, the tax-included grand total amount data is calculated by grand-totaling the tax-included total amount data based on the respective tax rates, and this tax-included grand total amount data is displayed. Thereafter, if the tax-included 1 calculation key 11*b* or tax-included 2 calculation key 11*c* is operated, the first or second tax-included total amount data and the first or second tax-excluded total amount data, which are based on the corresponding tax rate and are stored in the tax rate 1 total memory area 22*b* or tax rate 2 total memory area 22*c*, are read out, and are displayed on the main display unit 12 and sub-display unit 13.

Thereby, by the very simple operation, after the tax-included grand total amount data and tax-excluded grand total amount data, which are based on the plural tax rates, are confirmed, the tax-included total amount data and tax-excluded total amount data of each tax rate can easily be confirmed.

Additionally, according to the electronic calculator 10 with the above-described configuration, in accordance with the operation of the tax calculation total key 11*f*, if the tax-included grand total amount data, in which the tax-included total amount data based on the respective tax rates are grand-totaled, is calculated and displayed, this tax-included grand total amount data is stored in the change calculation total memory 22*f*. Here, if numerical value data is input as a deposit amount, and the change key 11*x* is operated, the change amount data, which is obtained by subtracting the tax-included grand total amount data from the input numerical value data (deposit amount data), is calculated and displayed on the main display unit 12, and the tax-included grand total amount data is displayed on the sub-display unit 13.

Thereby, by the very simple operation, the tax-included grand total amount data based on the plural tax rates can be confirmed, the deposit amount data can be input, and the change amount data with respect to the deposit amount data can be confirmed. Moreover, the change amount data can be confirmed together with the tax-included grand total amount data.

Furthermore, according to the electronic calculator 10 with the above-described configuration, in accordance with the operation of the change key 11*x*, the change amount data, which is obtained by subtracting the tax-included grand total amount data from the deposit amount data, is displayed on the main display unit 12, and the tax-included grand total amount data is displayed on the sub-display unit 13. Thereafter, if the change key 11*x* is successively operated, the deposit amount data is displayed on the sub-display unit 13, while the display of the change amount data is kept on the main display unit 12. Therefore, by the very simple operation, after the change amount data with respect to the tax-included grand total amount data is confirmed, the change amount data with respect to the deposit amount data can also be confirmed.

In the meantime, in the above description, although the case in which input operations are executed on the tax-included 1 calculation key 11*b* and tax-included 2 calculation key 11*c* has been described by way of example, the same processes can be executed in the case in which input operations are executed on the tax-excluded 1 calculation key 11*d* and tax-excluded 2 calculation key 11*e*. However, when the tax-excluded 1 calculation key 11*d* or tax-excluded 2 calculation key 11*e* was operated, it is assumed that the processor 21 displays the tax-excluded amount with priority over the tax-included amount. In the other respects, the processes are executed in the same manner as in the case in which the tax-included 1 calculation key 11*b* or tax-included 2 calculation key 11*c* was operated.

Additionally, the methods described in the embodiments, that is, the respective methods of the processes, etc. illustrated in the flowcharts of FIG. 3 to FIG. 6, can all be stored as computer-executable programs in a storage medium, such as a memory card (ROM card, RAM card, etc.), a magnetic disk (flexible disk, hard disk, etc.), an optical disc (CD-ROM, DVD, etc.), or a semiconductor memory, and can be distributed. In addition, the computer reads the program, which is stored in the external storage medium, and the operation is controlled by this read-in program. Thereby, it is possible to realize the same processes as the functions described in the embodiments.

Additionally, the data of the program for realizing each of the above-described methods can be transmitted on a network (Internet) in the form of program data, and the program data can be taken in from a computer (server apparatus, etc.) connected to this network (Internet), and thereby it is possible to realize the same functions as in the above-described embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A calculation device comprising:
a display including a first display area and a second display area; and
a processor, the processor being configured to:
accept operations of at least one of a plurality of tax calculation keys which are associated with a plurality of tax rates, respectively; and
when an operation of a tax calculation key associated with one of the plurality of tax rates is accepted with respect to displayed numerical value data which indicates tax-excluded amount data and which is displayed on the first display area:
display tax-included amount data on the first display area, the tax-included amount data being calculated based on the tax rate corresponding to the tax calculation key having been operated; and
display, on the second display area, tax-included total amount data which indicates a total of the tax-included amount data corresponding to at least one piece of numerical value data including the displayed numerical value data.

2. The calculation device of claim 1, wherein, when an operation of a tax calculation total key is accepted, the processor displays, on the first display area, tax-included grand total amount data in which the tax-included total amount data of the plurality of tax rates are grand-totaled, and displays, on the second display area, tax-excluded grand total amount data corresponding to the tax-included grand total amount data.

3. The calculation device of claim 2, wherein, when the operation of the tax calculation total key is accepted in a state in which the tax-included grand total amount data is displayed on the first display area and the tax-excluded grand total amount data is displayed on the second display area, the processor displays, on the first display area, the tax-excluded grand total amount data corresponding to the tax-included grand total amount data, and displays, on the second display area, tax grand total amount data corresponding to the tax-included grand total amount data.

4. The calculation device of claim 2, wherein, when an operation of a tax calculation key associated with one of the plurality of tax rates is accepted after the operation of the tax calculation total key is accepted, the processor displays, on the first display area, the tax-included total amount data which indicates the total of the tax-included amount data calculated based on the tax rate corresponding to the tax calculation key having been operated, and displays, on the second display area, the tax-excluded total amount data corresponding to the tax-included total amount data displayed on the first display area.

5. The calculation device of claim 2, wherein, when an operation of a change key is accepted after the operation of the tax calculation total key is accepted, the processor causes the display to display change amount data which is calculated by subtracting the tax-included grand total amount data from numerical value data which indicates deposit amount data displayed on the first display area.

6. The calculation device of claim 5, wherein the processor displays the change amount data on the first display area, and to displays the tax-included grand total amount data on the second display area.

7. The calculation device of claim 6, wherein, when the operation of the change key is accepted in a state in which the change amount data is displayed on the first display area and the tax-included grand total amount data is displayed on the second display area, the processor displays, on the second display area, the numerical value data which indicates the deposit amount data.

8. A calculation method of a calculation device including a processor, the method being executed under control of the processor, and the method comprising:
   accepting operations of at least one of a plurality of tax calculation keys which are associated with a plurality of tax rates, respectively; and
   when an operation of a tax calculation key associated with one of the plurality of tax rates is accepted with respect to displayed numerical value data which indicates tax-excluded amount data and which is displayed on a first display area of the calculation device:
   displaying tax-included amount data on the first display area, the tax-included amount data being calculated based on the tax rate corresponding to the tax calculation key having been operated; and
   displaying, on a second display area of the calculation device, tax-included total amount data which indicates a total of the tax-included amount data corresponding to at least one piece of numerical data including the displayed numerical value data.

9. A non-transitory computer-readable storage medium which stores a program that is executable by a computer of a calculation device to control the computer to execute processes comprising:
   accepting operations of at least one of a plurality of tax calculation keys which are associated with a plurality of tax rates, respectively; and
   when an operation of a tax calculation key associated with one of the plurality of tax rates is accepted with respect to displayed numerical value data which indicates tax-excluded amount data and which is displayed on a first display area of the calculation device:
   displaying tax-included amount data on the first display area, the tax-included amount data being calculated based on the tax rate corresponding to the tax calculation key having been operated; and
   displaying, on a second display area of the calculation device, tax-included total amount data which indicates a total of the tax-included amount data corresponding to at least one piece of numerical value data including the displayed numerical value data.

* * * * *

UNITED STATES PATENT AND TRADEMARK OFFICE
CERTIFICATE OF CORRECTION

PATENT NO. : 10,235,328 B2
APPLICATION NO. : 15/711772
DATED : March 19, 2019
INVENTOR(S) : Kazuhiko Arikawa et al.

Page 1 of 1

It is certified that error appears in the above-identified patent and that said Letters Patent is hereby corrected as shown below:

In the Claims

Column 19, Line 23, Claim 6, after "and" delete "to".

Signed and Sealed this
Third Day of September, 2019

Andrei Iancu
*Director of the United States Patent and Trademark Office*